United States Patent
Prehn

(10) Patent No.: US 7,963,349 B2
(45) Date of Patent: Jun. 21, 2011

(54) DRIVE AND STEERING EQUIPMENT FOR A FLOOR CONVEYOR

(75) Inventor: Volkmar Prehn, Hamburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 680 days.

(21) Appl. No.: 11/529,639

(22) Filed: Sep. 28, 2006

(65) Prior Publication Data

US 2007/0095594 A1 May 3, 2007

(30) Foreign Application Priority Data

Oct. 6, 2005 (DE) .......................... 10 2005 047 958

(51) Int. Cl.
*B62D 6/00* (2006.01)
*B60K 17/30* (2006.01)
*G05D 1/00* (2006.01)

(52) U.S. Cl. .............................. 180/6.2; 180/252; 701/1
(58) Field of Classification Search .................... 180/6.2, 180/252; 701/1
See application file for complete search history.

(56) References Cited

U.S. PATENT DOCUMENTS

| | | | | |
|---|---|---|---|---|
| 4,513,839 A | * | 4/1985 | Nieminski et al. | 180/253 |
| 4,778,024 A | * | 10/1988 | Matsumoto et al. | 180/167 |
| 5,128,598 A | * | 7/1992 | Avitan | 318/587 |
| 5,325,935 A | * | 7/1994 | Hirooka et al. | 180/211 |
| 5,924,512 A | * | 7/1999 | Wada | 180/253 |
| 6,408,230 B2 | * | 6/2002 | Wada | 701/1 |
| 6,688,416 B2 | * | 2/2004 | Higaki et al. | 180/253 |
| 7,591,340 B2 | * | 9/2009 | Scharfenberg et al. | 180/252 |

FOREIGN PATENT DOCUMENTS

| | | |
|---|---|---|
| EP | 1 053 182 B1 | 7/1998 |
| EP | 1 508 783 A1 | 5/2003 |

\* cited by examiner

*Primary Examiner* — Kevin Hurley
*Assistant Examiner* — Daniel Yeagley
(74) *Attorney, Agent, or Firm* — Vidas, Arrett & Steinkraus

(57) ABSTRACT

A drive and steering equipment for a floor conveyor, with a drive unit which has a driving motor, a gear and a driving wheel and which is mounted in a bearing around vertical axis in a vehicle-fixed frame of the floor conveyor, a steering motor which pivots the drive unit around the vertical axis, and a control arm, an angle sensor and a steering control equipment, which adjusts a steering angle of the driving wheel through the steering motor in accordance to the signal of the angle sensor, characterised in that the control arm is rotatably mounted in a bearing coaxially or axially parallel to the drive unit via a bearing component part, the angle sensor is attached on the bearing component part and measures the relative angle between the drive unit and the bearing component part and the steering control equipment adjusts the drive unit via the steering motor such that the relative angle becomes zero.

4 Claims, 3 Drawing Sheets

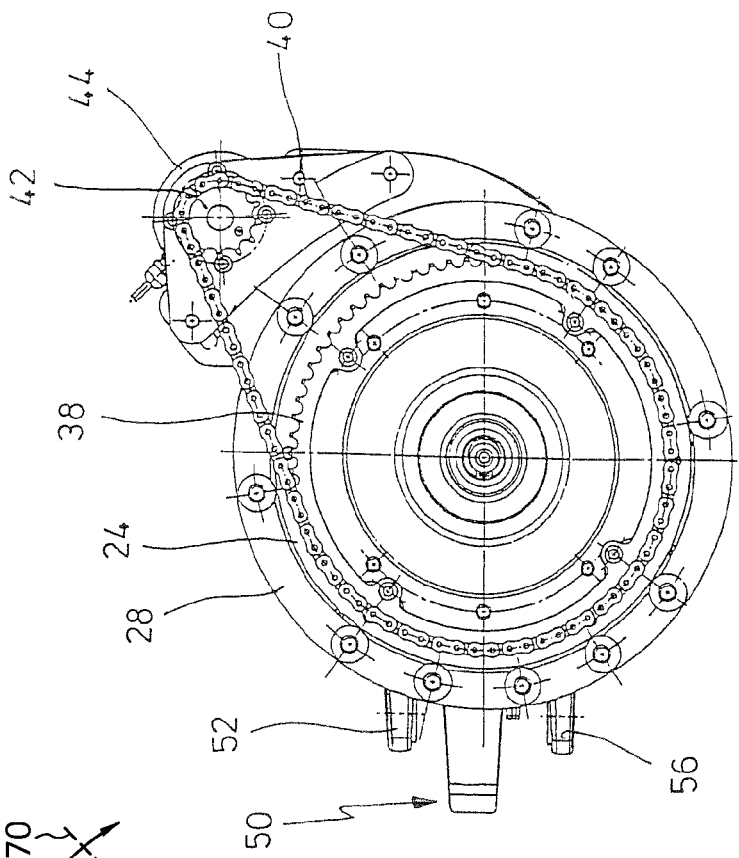
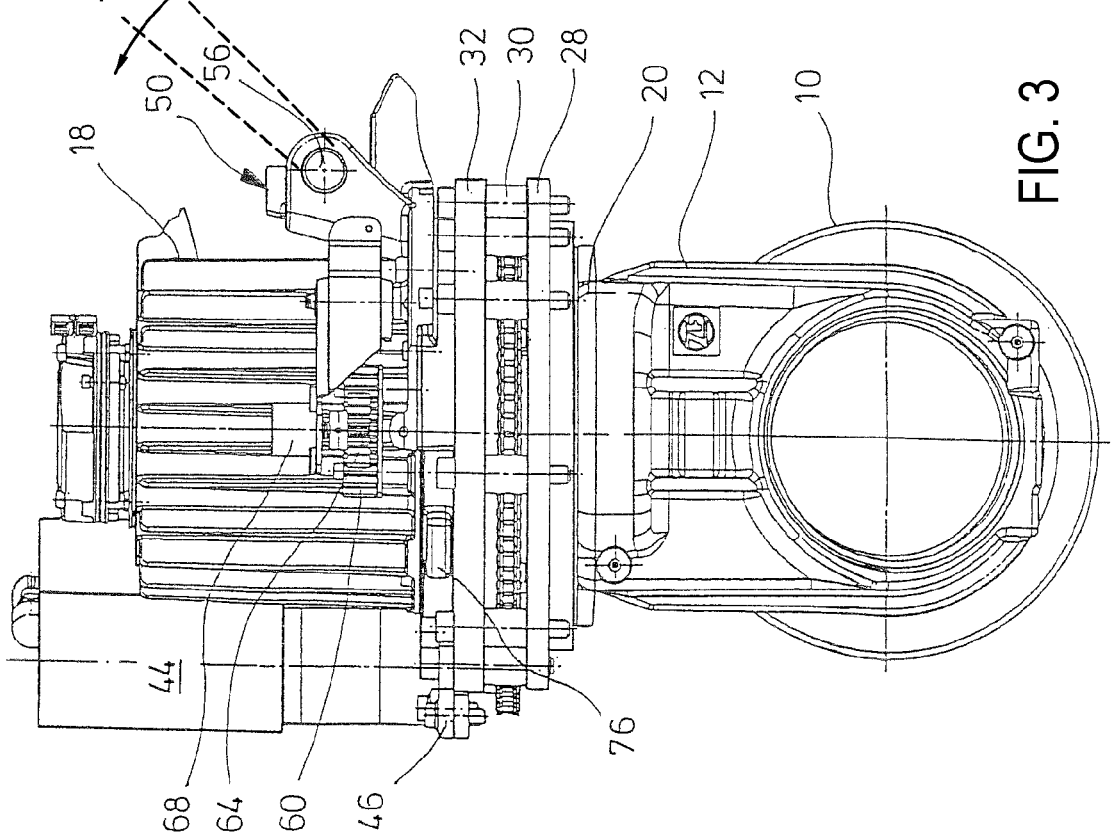

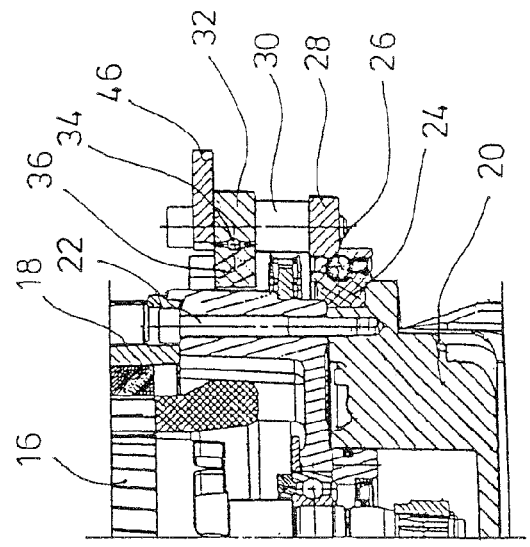
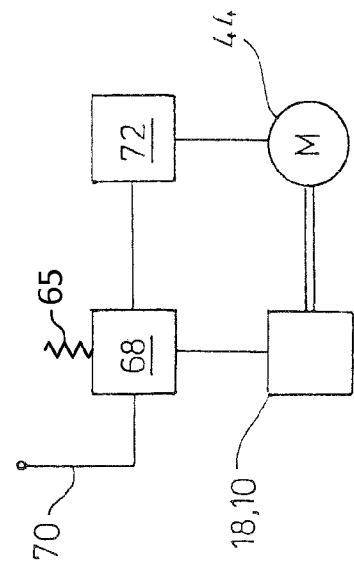
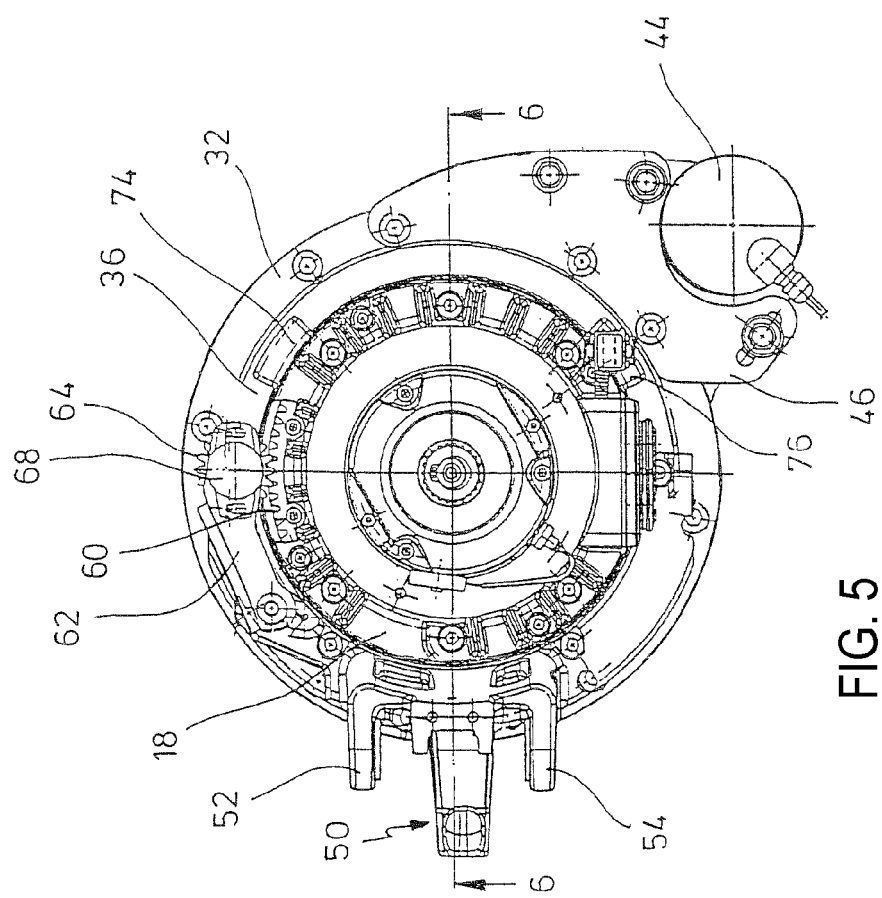

ical shift of the driving wheel and by that a steering action takes place. Usually, the control of the driving motor takes place via control elements on the head of the drawbar. It is not necessary to say that another control arm for the steering operation of the steered wheel can be provided too.
DRIVE AND STEERING EQUIPMENT FOR A FLOOR CONVEYOR

CROSS-REFERENCE TO RELATED APPLICATIONS

Not applicable.

STATEMENT REGARDING FEDERALLY SPONSORED RESEARCH

Not applicable.

BACKGROUND OF THE INVENTION

For instance, drawbar steered floor conveyors are realised such that one single driving wheel is mounted in a bearing around a horizontal axis in a bolster, and the bolster in its part is pivotally suspended around a vertical axis in the frame of the floor conveyor. The bolster supports also a driving motor for the steered wheel, which is in effective connection with the driving wheel via a gear. Thus, by pivoting the drawbar, an angular shift of the driving wheel and by that a steering action takes place. Usually, the control of the driving motor takes place via control elements on the head of the drawbar. It is not necessary to say that another control arm for the steering operation of the steered wheel can be provided too.

It is also known to provide a servo drive for the steering. For this purpose, a steering motor is used, which is fixedly attached on the frame and acts on a gearwheel which is arranged concentrically to the driving motor, via a chain for instance, in order to pivot the bolster or the driving unit, respectively. It is also known to fix a drawbar at another position of the vehicle frame, pivotally mounted around a vertical axis, without mechanical connection to the steered wheel. The steering angle is taken up by a sensor, which is shifted upon a pivotal movement of the drawbar. This signal is input as a desired value into a control equipment. A second sensor detects the steering angle of the steered wheel and transmits this value as a real value to the control equipment. With the aid of a suitable algorithm, real value and desired value are compared in the control equipment and a current is provided for the servo drive, so that the real value comes closer to the desired value. When the values are equal, the servo drive is switched off.

The present invention is based on the objective to provide a compact drive and steering equipment for drawbar-guided floor conveyors, which is realised with particularly little expenditure. In addition, it should have the property that it can readily replace conventional drive units.

BRIEF SUMMARY OF THE INVENTION

In the equipment according to the present invention, the control arm, a drawbar for instance, is rotatably mounted coaxially or axially parallel to the drive unit by means of a preferably annular bearing component part. Preferably, an annular bearing component part is mounted in a frame-fixed bearing ring. It is also conceivable to mount the bearing component part on the drive unit. Naturally, the drive unit in its turn is rotatably mounted in the frame. In the equipment according to the present invention, this rotatable bearing is without stops. An angle sensor is fixed on the bearing component part, and thus is moved along together with the control arm when the latter is pivoted around the vertical axis. It measures the angle relative to the drive unit. When a steering operation is initiated with the aid of the control arm, a drawbar for instance, a relative movement between the control arm with the angle sensor and the drive unit takes place at first. This angle leads to the activation of the steering motor, and the drive unit is pivoted as long till the angle which had been temporarily created between control arm and drive unit becomes zero again. With other words, there is a position control towards a difference angle of zero.

In the equipment according to the present invention, control arm and drive unit can be mounted concentrically with respect to each other. Through this, a compact, little expensive preassembly unit is achieved, which can also replace conventional drive units interface-compatibly without electric lines, for example. Only one sensor is needed in the equipment according to the present invention. The sensor is transmitter and rotational angle measuring device at the same time.

Different possibilities of construction are conceivable to let sensor and drive unit co-operate. One embodiment of the present invention provides for this purpose that the drive unit has a concentric ring gear and the sensor has a sprocket which is in engagement with the ring gear. According to a further embodiment of the present invention, the sensor with the sprocket is pre-tensioned in the direction of the ring gear by means of a spring, in order to realise a tolerance compensation and a clearance-free tooth engagement. It is not necessary to say that the ring gear does not have to be closed, instead a tooth segment the radius of which passes through the rotational axis of the drive unit is sufficient.

In the case that the electric supply of the servo steering fails, a further embodiment of the present invention provides that stops are provided on the drive unit in angular distance to both sides of the zero position of the control arm, against which the drawbar or its bearing component part, respectively, knocks when the drawbar is pivoted about the angular distance with respect to the drive unit. In this way an emergency steering ability is achieved, even though with a slip error. The difference angle between the zero position of the drawbar and the stops is at about 20°, for instance.

As a rotational angle sensor, a contactless magnetic rotational angle sensor can be provided, for instance, which creates separate analogue signals for the sinus and the cosinus part of the measured angle. Such a sensor has become known from EP 1 053 182 A1, for instance, the entire contents of which is incorporated herein by reference. From EP 1 508 783 A1, the entire contents of which is incorporated herein by reference, it has also become known to use the sinus and the cosinus part of a rotational angle sensor for the calculation of the rotational angle and to perform a temperature correction at the same time. By storing ideal values of the output signals in an evaluation unit, which result from the geometrical relation of the sensors, and by comparing the measured output signals with the ideal values, a warning or stopping signal can be created, when the difference between measured and ideal value reaches a predetermined amount. In this way it is possible to monitor erroneous functions of the sensor in an efficient manner.

BRIEF DESCRIPTION OF THE SEVERAL VIEWS OF THE DRAWINGS

The present invention will be explained in more detail by means of drawings in the following.

FIG. 3 shows the rear view of the equipment according to FIG. 1.

FIG. 4 shows the view under the equipment according to FIG. 1 from underneath, in the direction of the arrows 4.

FIG. 5 shows the top view on the equipment according to FIG. 1, in the direction of the arrow 5.

FIG. 6 shows a partial section through the equipment according to FIG. 1, along the line 6-6.

FIG. 7 shows very schematically the steering control of the equipment shown in FIGS. 1 to 5.

DETAILED DESCRIPTION OF THE INVENTION

Figure 2:
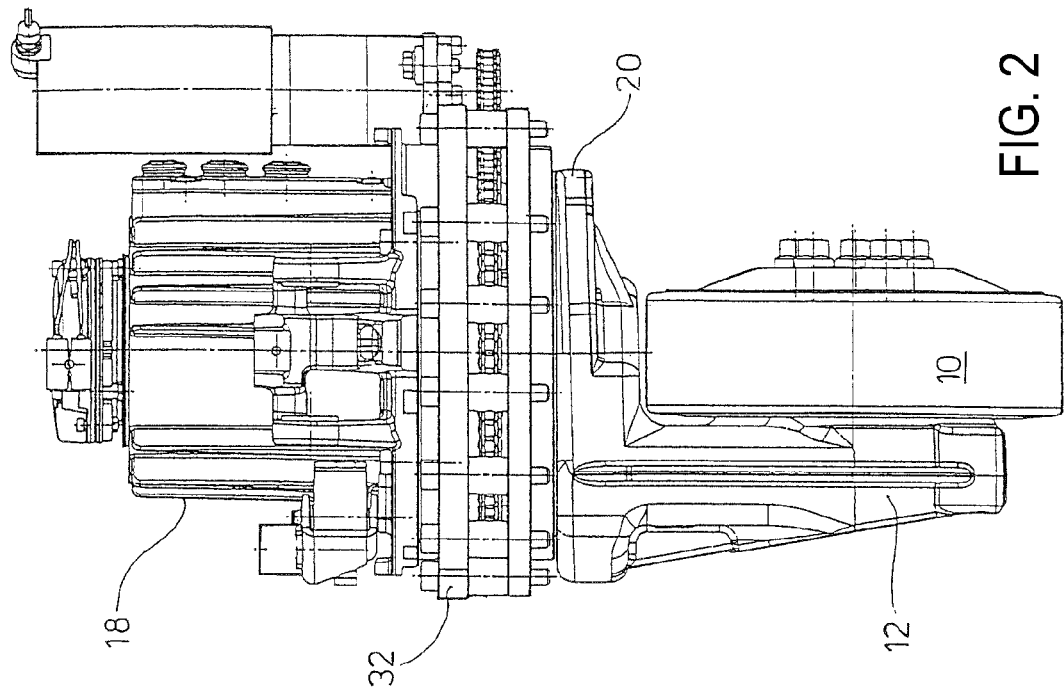
FIG. 2 shows the side view of the drive and steering unit according to the invention, twisted about 90° with respect to FIG. 1.
Figure 1:
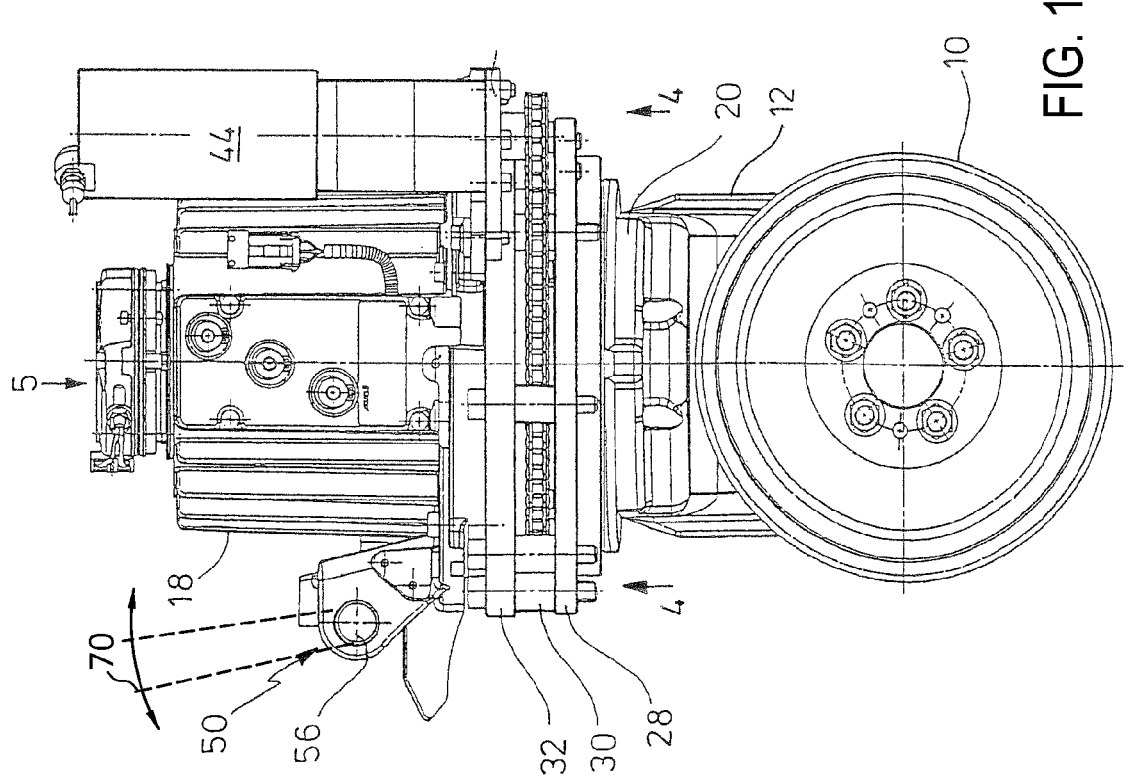
FIG. 1 shows the side view of a drive and steering unit according to the invention.

While this invention may be embodied in many different forms, there are described in detail herein a specific preferred embodiment of the invention. This description is an exemplification of the principles of the invention and is not intended to limit the invention to the particular embodiment illustrated In FIGS. 1, 2 and 3, a driving wheel 10 of a drawbar-steered floor conveyor is shown, which is single-sided mounted on a leg 12. In the leg 12, there is a gear (not shown), which is fixedly coupled with the output shaft of a motor 16, of which a casing 18 is represented in FIGS. 1 to 3. The leg 12 is attached on a horizontal plate 20, which is in turn connected with the casing 18 through screw bolts 22 (FIG. 6). An inner bearing ring 24 is fixedly connected with these parts, which co-operates via a roller bearing 26 with an outer ring 28, which is fixedly attached in the not shown frame of the not shown floor conveyor. In this way, motor casing 18 and wheel 10 can pivot around a vertical axis, which extends through the axis of the motor 16 and through the centre of the wheel 10. Via a series of bolts 30, the frame-fixed ring 28 is connected with an upper frame-fixed ring 32, which has an inner ring 24, by means of a roller bearing 34. As can be recognised in FIG. 4, a ring gear or gearwheel 38 is splinedly connected with the same, around which a chain 40 is wound in a loop. The chain is also wound around a sprocket 42, which is in turn fixed on the driving shaft of a steering motor 44. When the steering motor is actuated, it pivots the driving wheel 10 and the motor 16 around a vertical axis into one or the other direction, depending on the rotational direction of the steering motor 44. The steering motor 44 is flange-connected with the frame-fixed ring 32 by means of a plate 46.

A bearing component part 50 has two arms 52, 54 (FIG. 5) with one opening 56 each at a time for the articulation of a not shown drawbar. Thus, the drawbar is pivotally mounted in a bearing around a horizontal axis. The bearing component part 50 is connected with the inner bearing ring 36. Thus, the drawbar is pivotally mounted in a bearing around the vertical axis.

On the perimeter of the casing 18 of the motor 16, a tooth segment 60 is fixed, the radius of which runs through the vertical axis. As can be recognised from FIG. 5, the tooth segment 60 is offset about an angle of about 90° with respect to the bearing component part 50. On the ring 36, a lever 62 is pivotally mounted, in which a sprocket 64 is rotatably mounted, which meshes with the tooth segment 60. A spring 65 (shown schematically in FIG. 7) pre-tensions the sprocket 64 against the tooth segment 60.

The sprocket 64 actuates a sensor 68, a magnetic contactless rotational angle sensor in particular, as has been already described above. When the drawbar and with it the bearing component part 50 is pivoted about a certain angle around the vertical axis of the described equipment with the aid of the bearing ring 36, the rotational angle sensor is shifted about a certain angle amount via the tooth segment 60 and the sprocket 64. In FIG. 7, the drawbar is indicated at 70 and the sensor at 68. The sensor gives its signal to a control equipment 72. The control equipment 72 is dimensioned such that it wants the measured angle to become zero by triggering the steering motor 44. Thus, it actuates the unit of motor and driving wheel 10 through the described driving connection, as long till the angle has reached zero. The measurement of the control process, i.e. the resetting of the relative angle between drawbar 70 and motor unit is on the other hand detected by sensor 68. In other words, with its signal the sensor 68 parameterizes continuously the desired value, which is always made to be zero via the steering motor 44 by actuation. In this way, an electrically controlled and actuated follow-up control for the steering of the wheel 10 is obtained.

In FIG. 5, stops can be recognised at 74 and 76, which are connected with the casing 18. Parts of the inner bearing ring 36 co-operate with these stops in order to realise an emergency steering. In the case of failure of the electric supply, the drive unit and with it the wheel 10 can be pivoted through co-operation of the drawbar with the stops 74, 76, wherein a dead path has to be overcome via a slip angle at first.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A drive and steering equipment for a floor conveyor, with a drive unit which has a driving motor, a gear and a driving wheel and which is mounted in a bearing around a vertical axis in a vehicle-fixed frame of the floor conveyor, a steering motor which pivots the drive unit around the vertical axis, and a drawbar, an angle sensor and a steering control equipment, which adjusts a steering angle of the driving wheel through the steering motor in accordance with the signal of the angle sensor, characterised in that the drawbar is rotatably mounted in a bearing coaxially or axially parallel to the drive unit by means of a bearing component part (50), the angle sensor (68)

is attached on the bearing component part (50) and the steering control equipment (72) adjusts the drive unit via the steering motor (44);

further wherein the bearing component part (50) is circular and rotatably mounted coaxially to the drive unit;

further wherein the bearing component part (50) is rotatably mounted in a frame-fixed bearing ring (32);

further wherein the drive unit has a tooth segment (60) and the sensor (68) has a sprocket (64), which is in engagement with the tooth segment (60), and further wherein that the sensor (68) with the sprocket (64) is pre-tensioned in the direction of the tooth segment (60) by means of a spring.

2. An equipment according to claim 1, characterised in that stops (74, 76) are provided on the drive unit in angular distance to both sides of a zero position of the drawbar, against which the drawbar or the drawbar's bearing component part, respectively, knocks when the drawbar is pivoted about the angular distance with respect to the drive unit.

3. An equipment according to claim 1, characterised in that a contactless magnetic rotational angle sensor is provided, which creates separate analogue signals for a sine and a cosine part of a measured angle.

4. An equipment according to claim 1, characterised in that the control equipment (72) generates an output signal of the angle sensor (68) when a difference between a measured and an ideal value reaches a predetermined amount.

* * * * *